United States Patent Office 3,629,181
Patented Dec. 21, 1971

3,629,181
NEW ADDUCT CURING AGENTS FROM POLY-
EPOXIDES AND CYCLOALIPHATIC DIAMINES
Alfred Heer, Basel, Wolfgang Schneider, Allschwil, and
Bernd Dreher, Aesch, Basel-Land, Switzerland, as-
signors to Ciba Limited, Basel, Switzerland
No Drawing. Filed July 28, 1969, Ser. No. 845,547
Claims priority, application Switzerland, Aug. 2, 1968,
11,639/68
Int. Cl. C08g *17/13, 51/40*
U.S. Cl. 260—31.8 E                 12 Claims

ABSTRACT OF THE DISCLOSURE

New adduct curing agents from a polyphenol-poly-glycidyl ether (special liquid diomethane-diglycidyl ethers, such as Epi Z) and a cycloaliphatic di-primary diamine ("isophoronediamine", 4,4' - methylene-bis-(2-methyl-cyclohexylamine)) with an excess of 1.5 to 2.7 mols of diamine being used per 1 epoxide equivalent of the polyglycidyl ether. By addition of diluents of low volatility (dibutyl phthalate, polypropylene glycol or tri-methylhexamethylenediamine) liquid curing agent formulations are obtained for "solvent-free" lacquers based on liquid epoxide resins. As a rule phenols (diomethane, "tris-Mannich") are further added as accelerators to the curing agent formulations. The lacquers formulated with the new adduct curing agents, in contrast to known lacquers based on cycloaliphatic diamines as such, do not tend to surface faults of the films when cured at room temperature.

It is known, for example from German patent specification 1,006,991 and from "Deutsche Auslegeschriften" 1,006,101 and 1,236,195, to react polyepoxide compounds with equivalent quantities of cycloaliphatic or cycloaliphatic-aliphatic polyamines to give insoluble polyadducts. Coatings manufactured therewith are in part remarkably light, glossy and light-resistant. When using these amines as curing agents for epoxide resins based on polyphenols, such as diomethane, in coverings and coatings, some disadvantages manifest themselves, above all when curing solvent-free formulations at room temperature. Surface faults arise which are known as orangepeel or frosting effects.

Furthermore the crosslinking only takes place incompletely so that the flexibility of the cured layers (the deep drawing values according to Erichsen are less than 0.4 mm.) and the resistance to acids and solvents are unsatisfactory. Additionally, there is a strong tendency to sweating-out phenomena on the surface during curing in the case of polyamines which only contain one cyclohexane ring, so that coatings manufactured therefrom are frequently not yet fully dust-dry after several days.

The amines mentioned are therefore used for coatings mostly only in the form of formulations containing volatile solvents. The general disadvantages of such lacquer systems containing solvents are known to the expert.

It has now been found that these disadvantages can be overcome by using, instead of the cycloaliphatic polyamines as such, novel adducts of liquid polyglycidyl ethers of polyphenols and of an excess (1.5-2.7 mols per equivalent of epoxide group) of certain cycloaliphatic or cycloaliphatic-aliphatic di-primary diamines. Since the adducts in question are as a rule highly viscous to solid at room temperature, they are mixed with certain additives in order to lower their viscosity for use in spreadable coating materials or lacquer formulations. The additives must at room temperature be of relatively low viscosity and at the same time of relatively low volatility, and should furthermore not cause any sweating-out phenomena on the surface during film formation on reaction of the adduct curing agent with the epoxide resin and should also not impair the chemical resistance of the cured lacquer films or coatings. Additives which lower the viscosity and which fulfill these prerequisites are for example dibutyl phthalate and polypropyleneglycols, and also certain high-boiling liquid polyamines such as trimethyl-hexamethylenediamine or isophoronediamine.

Since the additives which lower the viscosity are of low volatility, the lacquer formulations manufactured on this basis possess the technical use advantages of solvent-free systems.

Admittedly, adduct curing agents based on epoxide resins and aliphatic polyamines or polyaminoamides (compare British patent specification 691,543 and Austrian patent specification 243,517) have already been known for some time which possess various technical use advantages relative to the aliphatic polyamines or polyaminoamides as such, such as lower volatility, physiological harmlessness and lower moisture sensitivity of the lacquer films produced therewith.

On the other hand these known adducts are as a rule liquid so that the expert is not faced by any major problems in their technical use in spreadable coating materials and lacquers.

However, the outstanding suitability of the present novel adducts particularly for the surface protection and lacquer field could not be envisaged. On the contrary, because of their generally highly viscous to solid consistency, a prejudice against their technical usability or at least against their representing an advance had to be entertained.

If the ratio of amine equivalents of the polyamine to epoxide groups equivalents of the liquid glycidyl ether used for the adduct formation chosen is so high that a product of acceptably low viscosity is obtained, then no technical improvement is achieved on employing this adduct relative to the use of the cycloaliphatic polyamines as such. If on the other hand the highly viscous to solid adducts are diluted with a volatile organic lacquer solvent, then the known disadvantages of such systems such as increased fire hazard and physiological in acceptability result.

The expert had to entertain a serious prejudice against the use of diluents of low volatility of the plasticiser type, since it is known that it is particularly such additives which in the lacquer field lead to surface faults as a result of sweating-out of the plasticiser. Thus there existed no grounds for assuming that a technical advance would be achievable with the new adduct curing agents. Much rather, the contrary was be expected. It was necessary to overcome a prejudice in order to find that contrary to the known technical rule the present new adducts can surprisingly be diluted with suitable additives of low volatility and low viscosity without sweating-out phenomena arising on use in lacquer technology.

Only as a result of this non-obvious finding was it possible to open up the adduct curing agents, which have hitherto not been described in the literature, from liquid polyglycidyl ethers of polyphenols and cycloaliphatic polyamines for the field of technology.

The subject of the present invention are thus new adducts, suitable for use as curing agents for epoxide resins, from (1) a polyglycidyl ether of a polyphenol, which is liquid at room temperature and (2) a cycloaliphatic or cycloaliphatic-aliphatic di-primary diamine, in which at least one of the primary amino groups is bonded to an endocyclic carbon atom of a cycloaliphatic ring, with 1.5 to 2.7 mols of the diamine (2) having been used per 1 epoxide equivalent of the polyglycidyl ether (1) for the adduct formation.

The new adduct curing agents are manufactured according to the invention by reacting (1) a polyglycidyl ether of a polyphenol, which is liquid at room temperature, with (2) a cycloaliphatic or cycloaliphatic-aliphatic di-primary diamine in which at least one of the primary amino groups is bonded to an endocyclic carbon atom of a cycloaliphatic ring, in a quantity ratio of 1.5 to 2.7 mols of the diamine (2) per 1 epoxide group equivalent of the polyglycidyl ether (1), with warming and in particular preferably in the absence of solvents.

The polyglycidyl ethers which are liquid at room temperature, that is to say at 25° C. are derived from polyhydric phenols or polyphenols, such as resorcinol, phenolformaldehyde condensation products of the type of the resols or novolacs, bis-(p-hydroxyphenyl)-methane and especially 2,2 - bis - (p - hydroxyphenyl)propane (=diomethane).

Compounds to be specially mentioned here are the polyglycidyl ethers of diomethane which are liquid at room temperature, which possess an epoxide content of 3.8 to 5.8 epoxide equivalents/kg. and which correspond to the average formula

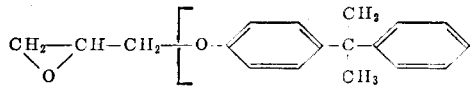 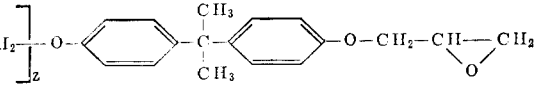

wherein z denotes a number having a value from 0 to 0.65.

Possible di-primary diamines for the adduct formation are for example: 1,2-diaminocyclohexane, 1,3-diaminocyclohexane, or 1,4-diaminocyclohexane. The cyclic residues can be substituted in the ring, for example by alkyl or cycloalkyl residues. Examples are 1,2-diamino-4-ethylcyclohexane, 1,4 - diamino - 3,6 - diethylcyclohexane and 1-cyclohexyl-3,4-diaminocyclohexane. Further possibilities are 1,8-diamino-p-methane and 3-aminomethyl-3,5,5-trimethyl-1-cyclohexylamine. Amongst the polyamines with several cyclohexyl rings, there may be mentioned 4,4'-diaminodicyclohexylmethane, dodecahydrobenzidine, and 2,2-di-(4-aminocyclohexyl)-propane, as well as their derivatives which are substituted in the cyclic residues, for example by alkyl, alkoxy or cycloalkyl, such as for example 4,4'-methylene-bis-(2 - methyl - cyclohexylamine). Further possibilities are 1,2- or 1,3-diaminocyclopentane, 1-amino - 2 - aminomethyl - cyclopentane, 1 - amino - 3-aminomethyl-cyclopentane as well as their derivatives which are substituted by alkyl in the cyclopentane ring.

The best technical results in the lacquer field are achieved with adduct curing agents based on 1,8-diamino-p-menthane, 3-aminomethyl-3,5,5-trimethyl-1-cyclohexylamine (="isophoronediamine") or 4,4'-methylene-bis(2-methylcyclohexylamine) as diamine components, and liquid polyglycidyl ethers of diomethane with 3.8 to 5.8 epoxide equivalents/kg. as polyglycidyl ether components.

In order to manufacture liquid storage-stable adduct curing agents which after mixing with liquid epoxide resins yield ready-to-use lacquer formulations which as a rule cure at room temperature or slightly elevated temperature, the adducts according to the invention are further mixed with suitable additives for lowering the viscosity, for promoting complete cure at room temperature, for plasticising the cured coatings and for the prevention of surface faults through atmospheric moisture or carbon dioxide.

In order to lower the viscosity liquid substances are added which have to fulfill the following prerequisites: good compatibility with the new adducts and liquid epoxide resins, viscosity at 25° C. not greater than 500 centipoises and boiling point of at least 220° C.; furthermore the substances should not cause any sweating-out phenomena on the film surface on reaction of the adduct curing agent with the liquid epoxide resin to form a cured film, and should not worsen the chemical resistance of the film. These prerequisites are fulfilled by certain known plasticisers for curable epoxide resin systems. The following may above all be mentioned: phthalic acid esters such as dioctyl phthalate, dicyclohexyl phthalate, benzylbutyl phthalate, dimethoxyethyl phthalate, dibutoxyethyl phthalate and dibutyl phthalate; adipic acid esters such as benzyloctyl adipate, as well as polyesters of adipic acid with polyols ("Scadoplast RA 10"); sebacic acid esters such as dibutyl sebacate; carbamic acid ester resins, especially from butylurethane and formaldehyde ("Uresin B"); polyglycols such as polyethylene glycols and polypropylene glycols; chlorodiphenyls with a chlorine content of about 60% ("Clophen A 60"), and mixtures of alkyl-substituted (alkyl residue higher than methyl) naphthalenes of boiling range 280–368° C. ("Mobilsol 44"). Di-n-butyl phthalate and polypropylene glycol of average molecular weight 425 are particularly suitable. Such plasticisers furthermore make a desired contribution to the plasticisation of the cured coatings. The presence of the plasticisers results in no worsening of the chemical resistance of the cured coatings, but rather in a considerable improvement since in this case the crosslinking at room temperature goes much further than without plasticiser. As an explanation, it can be assumed that at the same cure temperature the resin-curing agent system, as a result of the addition of plasticiser, only "becomes glass-like" after reaching a higher degree of crosslinking.

A further class of compounds which can be employed for lowering the viscosity are liquid aliphatic, cycloaliphatic-aliphatic or cycloaliphatic polyamines of low volatility, and in particular above all those which possess alkyl side-chains on the cycoaliphatic ring or on the linear aliphatic chain. The preferentially used amines are: trimethyl-hexamethylenediamine (isomer mixture), 4,4'-methylene-bis-(2-methyl-cyclohexylamine) and 1-amino-3-aminomethyl-3,5,5-trimethyl-1-cyclohexane.

Preferably, a diluent of the plasticiser type combined with a diluent of the amine type is employed. The total amount of diluent added is as a rule 5 to 40% by weight calculated relative to the total weight of the components present in the ready-to-use liquid curing agent formulation. The proportion of the diluent of the plasticiser type is herein as a rule 0 to 30% by weight and the proportion of the diluent of the amine class 0 to 17% by weight, calculated relative to the total weight of the formulation. When adding a diluent of the amine type it is furthermore necessary to take care that in the ready-to-use formulated curing agent a total of not more than 2.7 mols of amine (that is to say diamine employed for the adduct formation+polyamine employed as diluent) in the free and bound form should be present per 1 epoxide equivalent of the polyglycidyl ether employed for the adduct formation. If therefore the maximum permissible amount of 2.7 mols of diamine per 1 epoxide equivalent has already been employed for the manufacture of the adduct, then exclusively only a diluent of the plasticiser type should further be added if the good technical lacquer properties are to remain fully preserved.

In order to promote complete cure, usual cure accelerators are appropriately added to the curing agent formulations, above all monophenols or polyphenols, such as phenol or diomethane, aminophenols ("Mannich bases") such as 2,4,6-tris-(dimethylaminomethyl)-phenol or tertiary amines. An addition of such accelerators is however not absolutely essential. The amount of accelerator added can therefore be 0 to 18% calculated relative to the total weight of the ready-to-use liquid curing agent formulation. Further additives such as for example flow control agents (for example urea-formaldehyde resins or silicone resins or silicone oils) can be added as required.

In order to manufacture ready-to-use lacquers and coating agents, the liquid adducts according to the process of the invention can be mixed with an equivalent part of liquid epoxide resin. Possible liquid epoxide resins of this kind are for example cycloaliphatic epoxide resins, such as vinylcyclohexene dioxide, limonene dioxide, 3',4'-epoxy-cyclohexylmethyl - 3,4 - epoxycyclohexanecarboxylate, 3',4'-epoxy-6'-methylcyclohexylmethyl-3,4-epoxy-6-methylcyclohexanecarboxylate and 3',4'-epoxyhexahydrobenzal-3,4-epoxycyclohexane-1,1-dimethanol; polyglycidyl esters such as tetrahydrophthalic acid diglycidyl ester and hexahydrophthalic acid diglycidyl ester, liquid polyglycidyl ethers of polyalcohols such as 1,4-butanediol or polypropylene glycols, as well as the same liquid polyglycidyl ethers of polyphenols such as especially polyglycidyl ethers of diomethane, which have been mentioned above as starting substances for the manufactured of the new adducts. The liquid epoxide resins can also be modified by addition of active diluents such as for example butylglycid or cresylglycid.

The curing agent formulations manufactured with the aid of the amine adducts according to the invention show, in addition to simplicity of manufacture, a series of advantages and improvements relative to the hitherto known and used curing agents for systems free of volatile solvents and based on liquid epoxide resins. The cured films are almost colourless and of high gloss, do not show any change in colour shade on exposure to chemicals, and have excellent stability to light. Complete cure is possible at room temperature and also at high atmospheric humidity. The films show no sweating-out phenomena or other surface faults. The flexibility and adhesion of the fully cured films to iron and concrete is good. The new adducts are stable and show no tendency to crystallisation even at low temperatures.

The curable systems, free of volatile solvents, of the liquid adduct mixtures and an equivalent part of liquid epoxide resin can contain yet further usual additives such as fillers, pigments or dyestuffs.

In addition to serving as lacquers and coating materials, they can also serve as adhesives and as impregnating, dipping and casting resins, especially in the electrical industry.

In the examples which follow the parts, unless otherwise stated, denote parts by weight and the percentages denote percentages by weight. The relationship of parts by volume to parts by weight is as of the millilitre to the gram.

The following polyepoxide compounds were used for the manufacture of amine adducts described in the examples as well as for the manufacture of cured lacquer films:

POLYEPOXIDE COMPOUND A

Epoxide resin manufactured by condensation of diomethane (2,2-bis(p-hydroxyphenyl)-propane) with a stoichiometric excess of epichlorhydrin in the presence of alkali, mainly consisting of diomethane-diglycidyl ether, which is liquid at room temperature and has the following characteristics: Epoxide content: approx. 5.7 epoxide equivalents/kg. Viscosity according to Hoeppler: approx. 5000 cp. at 25° C.

POLYEPOXIDE COMPOUND B

Epoxide resin manufactured analogously to polyepoxide resin A by condensation of diomethane with epichlorhydrin, which is liquid at room temperature and has the following characteristics:

Epoxide content: approx. 5.3 epoxide equivalents/kg.
Viscosity according to Hoeppler: approx. 9000 cp. at 25° C.

EXAMPLES OF MANUFACTURE

Example 1

434 g. (2.55 mols) of 3,5,5-trimethyl-3-(aminomethyl)-cyclohexylamine ("isophorone-diamine") are initially introduced into a suitable reaction vessel and warmed to 100° C. under nitrogen. 175 g. (1 epoxide equivalent) of liquid polyepoxide compound A are introduced over the course of 30 minutes with stirring and slight cooling in such a way that the temperature of the reaction mixture is 120 to 130° C. After a further 30 minutes at 120 to 130° C. 136 g. of phenol and 205 g. of di-n-butyl phthalate are successively added. The liquid storage-stable adduct solution thus manufactured is free of gelled or insoluble constituents and shows the following properties:

Viscosity according to Hoeppler: 9000 centipoises at 25° C.
Colour number according to Gardner-Holdt: 1–2
Amine group content: 5.35 equivalents/kg.

Example 2

An adduct solution is manufactured in the same manner as in Example 1 from 442 g. (2.6 mols) of 3,5,5-trimethyl-3-(aminomethyl)-cyclohexylamine, 189 g. (1 epoxide equivalent) of liquid polyepoxide compound B, 182 g. of phenol and 347 g. of di-n-butyl phthalate.

Viscosity according to Hoeppler: 3400 centipoises at 25° C.
Colour number according to Gardner-Holdt: 1
Amine group content: 4.5 equivalents/kg.

Example 3

An adduct is manufactured in the same manner as in Example 1 from 325 g. (1.9 mols) of 3,5,5-trimethyl-3-(aminomethyl)cyclohexylamine and 175 g. (1 epoxide equivalent) of liquid polyepoxide compound A. After the reaction, the adduct is mixed with 70 g. (0.44 mol) of technical trimethyl-hexamethylene-diamine (isomer mixture of 1,6-diamino-2,2,4-trimethylhexane and 1,6-diamino-2,4,4-trimethylhexane) and 45 g. (0.17 mol) of 2,4,6-tris-(dimethylaminomethyl)-phenol. The liquid storage-stable adduct solution shows the following properties:

Viscosity according to Hoeppler: 19,000 centipoises at 25° C.
Colour number according to Gardner-Holdt: 1–2
Amine group content: 8.4 equivalents/kg.

Example 4

An adduct is manufactured in the same manner as in Example 1 from 325 g. (1.9 mols) of 3,5,5-trimethyl-3-(aminomethyl)cyclohexylamine and 189 g. (1 epoxide equivalent) of liquid polyepoxide compound B. After the reaction the adduct is mixed with 101 g. (0.64 mol) of technical trimethyl-hexamethylenediamine (isomer mixture as in Example 3), with 124 g. of phenol and with 207 g. of dibutyl phthalate.

Viscosity according to Hoeppler: 6800 centipoises at 25° C.
Colour number according to Gardner-Holdt: 1
Amine group content: 5.35 equivalents/kg.

Example 5

An adduct is manufactured in the same manner as in Example 1 from 3.25 g. (1.9 mols) of 3,5,5-trimethyl- 3-(aminomethyl)cyclohexylamine and 189 g. (1 epoxide equivalent) of liquid polyepoxide compound B. After the reaction the adduct is mixed with 101 g. (0.64 mol) of technical trimethylhexamethylenediamine, 128 g. of phenol and 207 g. of polypropylene glycol of mean molecular weight 425.

Viscosity according to Hoeppler: 13,000 centipoises at 25° C.
Colour number according to Gardner-Holdt: 1
Amine group content: 5.35 equivalents/kg.

Example 6

An adduct is manufactured in the same manner as in Example 1 from 325 g. (1.9 mols) of 3,5,5-trimethyl-3-(aminomethyl)cyclohexylamine and 189 g. (1 epoxide equivalent) of liquid polyepoxide compound B. The adduct is diluted with 80 g. (0.5 mol) of technical trimethylhexamethylenediamine, 74 g. (0.28 mol) of 2,4,6-tris-(dimethylaminomethyl)-phenol and 95 g. of dibutyl phthalate.

Viscosity according to Hoeppler: 8000 centipoises at 25° C.
Colour number according to Gardner-Holdt: 1-2
Amine group content: 7.4 equivalents/kg.

Example 7

An adduct is manufactured in the same manner as in Example 1 from 325 g. (1.9 mols) of 3,5,5-trimethyl-3-(aminomethyl)cyclohexylamine and 189 g. (1 epoxide equivalent) of polyepoxide compound B. The adduct is mixed with 101 g. (0.64 mol) of technical trimethyl-hexamethylenediamine, 70 g. of 2,2-bis-(p-hydroxyphenyl)-propane ("diomethane") and 183 g. of dibutyl phthalate.

Viscosity according to Hoeppler: 6500 centipoises at 25° C.
Colour number according to Gardner-Holdt: 1
Amine group content: 5.9 equivalents/kg.

Example 8

An adduct is manufactured in the same manner as in Example 1 from 411 g. (3.6 mols) of 1-amino-2-aminomethylcyclopentane and 350 g. (2 epoxide equivalents) of polyepoxide compound A. The adduct is mixed with 180 g. of phenol 229 g. of dibutyl phthalate.

Viscosity according to Hoeppler: 6200 centipoises at 25° C.
Colour number according to Gardner-Holdt: 1
Amine group content: 6.1 equivalents/kg.

Example 9

An adduct is manufactured in the same manner as in Example 1 from 411 g. (3.6 mols) of 1-amino-2-aminomethylcyclopentane and 378 g. (2 epoxide equivalents) of polyepoxide compound B. The adduct is mixed with 120 g. (0.76 mol) of technical trimethyl-hexamethylenediamine isomer mixture, 200 g. of phenol and 221 g. of dibutyl phthalate.

Viscosity according to Hoeppler: 3500 centipoises at 25° C.
Colour number according to Gardner-Holdt: 1
Amine group content: 6.55 equivalents/kg.

Example 10

An adduct is manufactured in the same manner as in Example 1 from 456 g. (4 mols) of 1,2-diamino-cyclohexane and 378 g. (2 epoxide equivalents) of polyepoxide compound B. The adduct is mixed with 159 g. (1 mol) of technical trimethyl-hexamethylenediamine (isomer mixture), 226 g. of phenol and 300 g. of dibutyl phthalate.

Viscosity according to Hoeppler: 4200 centipoises at 25° C.
Colour number according to Gardner-Holdt: 5
Amine group content: 6.6 equivalents/kg.

Example 11

An adduct is manufactured in the same manner as in Example 1 from 456 g. (4 mols) of 1,2-diamino-cyclohexane and 378 g. (2 epoxide equivalents) of polyepoxide compound B. The adduct is mixed with 100 g. (0.63 mol) of technical trimethylhexamethylenediamine, 106 g. (0.4 mols) of 2,4,6-tris-(dimethylaminomethyl)-phenol and 200 g. of dibutyl phthalate.

Viscosity according to Hoeppler: 4200 centipoises at 25° C.
Colour number according to Gardner-Holdt: 5-6
Amine group content: 8.3 equivalents/kg.

Example 12

An adduct is manufactured in the same manner as in Example 1 from 325 g. (1.9 mols) of 1,8-diamino-p-menthane and 189 g. (1 epoxide equivalent) of polyepoxide compound B. The adduct is mixed with 100 g. (0.63 mol) of technical trimethylhexamethylenediamine (isomer mixture), 140 g. of phenol and 156 g. of dibutyl phthalate.

Viscosity according to Hoeppler: 1100 centipoises at 25° C.
Colour number according to Gardner-Holdt: 5
Amine group content: 5.6 equivalents/kg.

Example 13

An adduct is manufactured in the same manner as in Example 1 from 325 g. (1.9 mols) of 1,8-diamino-p-menthane and 175 g. (1 epoxide equivalent) of polyepoxide compound A. The adduct is mixed with 100 g. (0.63 mol) of technical trimethylhexamethylenediamine (isomer mixture), 100 g. of bisphenol A and 210 g. of dibutyl phthalate.

Viscosity according to Hoeppler: 6000 centipoises at 25° C.
Colour number according to Gardner-Holdt: 6
Amine group content: 5.6 equivalents/kg.

Example 14

An adduct is manufactured in the same manner as in Example 1 from 325 g. (1.9 mols) of 1,8-diamino-p-menthane and 189 g. (1 epoxide equivalent) of polyepoxide compound B. The adduct is mixed with 100 g. (0.63 mole) of technical trimethylhexamethylenediamine (isomer mixture), 140 g. of phenol and 156 g. of polypropylene glycol of mean molecular weight 425.

Viscosity according to Hoeppler: 2400 centipoises at 25° C.
Colour number according to Gardner-Holdt: 5-6
Amine group content: 5.6 equivalents/kg.

Example 15

An adduct is manufactured in the same manner as in Example 1 from 600 g. (2.5 mols) of 4,4'-methylene-bis(2-methylcyclohexylamine) and 175 g. (1 epoxide equivalent) of polyepoxide compound A. The adduct is mixed with 165 g. of phenol and 228 g. of dibutyl phthalate.

Viscosity according to Hoeppler: 9000 centipoises at 25° C.
Colour number according to Gardner-Holdt: 2
Amine group content: 4.3 equivalents/kg.

Example 16

An adduct is manufactured in the same manner as in Example 1 from 477 g. (2 mols) of 4,4'-methylene-bis-(2-methylcyclohexylamine) and 189 g. (1 epoxide equivalent) of polyepoxide compound B. The adduct is mixed with 79 g. (0.5 mol) of technical trimethyl-hexamethylenediamine (isomer mixture) and 160 g. of dibutyl phthalate.

Viscosity according to Hoeppler: 18,000 centipoises at 25° C.
Colour number according to Gardner-Holdt: 1–2
Amine group content: 5.5 equivalents/kg.

Example 17

An adduct is manufactured in the same manner as in Example 1 from 477 g. (2 mols) of 4,4'-methylene-bis-(2-methylcyclohexylamine) and 189 g. (1 epoxide equivalent) of polyepoxide compound B. The adduct is mixed with 103 g. (0.65 mol) of technical trimethyl-hexamethylenediamine (isomer mixture), 164 g. of phenol and 237 g. of dibutyl phthalate.

Viscosity according to Hoeppler: 11,000 centipoises at 25° C.
Colour number according to Gardner-Holdt: 1–2
Amine group content: 4.5 equivalents/kg.

Example 18

An adduct is manufactured in the same manner as in Example 1 from 477 g. (2 mols) of 4,4'-methylene-bis-(2-methylcyclohexylamine) and 175 g. (1 epoxide equivalent) of polyepoxide compound A. The adduct is mixed with 79 g. (0.5 mol) of technical trimethyl-hexamethylenediamine (isomer mixture), 69 g. of diomethane and 200 g. of dibutyl phthalate.

Viscosity according to Hoeppler: 12,000 centipoises at 25° C.
Colour number according to Gardner-Holdt: 1–2
Amine group content: 5.0 equivalents/kg.

Example 19

An adduct is manufactured in the same manner as in Example 1 from 477 g. (2 mols) of 4,4'-methylene-bis-(2-methylcyclohexylamine) and 189 g. (1 epoxide equivalent) of polyepoxide compound B. The adduct is mixed with 79 g. (0.5 mol) of technical trimethyl-hexamethylenediamine (isomer mixture), with 101 g. (0.38 mols) of 2,4,6-tris-(dimethylaminomethyl)-phenol and with 204 g. of dibutyl phthalate.

Viscosity according to Hoeppler: 9000 centipoises at 25° C.
Colour number according to Gardner-Holdt: 1
Amine group content: 5.8 equivalents/kg.

Example 20

An adduct is manufactured in the same manner as in Example 1 from 526 g. (2.5 mols) of 4,4'-methylene-bis-(cyclohexylamine) and 189 g. (1 epoxide equivalent) of polyepoxide compound B. The adduct is mixed with 159 g. of phenol and 266 g. of dibutyl phthalate.

Viscosity according to Hoeppler: 15,000 centipoises at 25° C.
Colour number according to Gardner-Holdt: 1–2
Amine group content: 4.4 equivalents/kg.

Example 21

An adduct is manufactured in the same manner as in Example 1 from 400 g. (1.9 mols) of 4,4'-methylene-bis-(cyclohexylamine) and 175 g. (1 epoxide equivalent) of polyepoxide compound A. The adduct is mixed with 79 g. (0.5 mol) of technical trimethyl-hexamethylenediamine (isomer mixture), 93 g. of phenol, 53 g. 0.2 mol) of 2,4,6-tris-(dimethylaminomethyl)-phenol and 200 g. of dibutyl phthalate.

Viscosity according to Hoeppler: 9000 centipoises at 25° C.
Colour number according to Gardner-Holdt: 2
Amine group content: 5.4 equivalents/kg.

Example 22

An adduct is manufactured in the same manner as in Example 1 from 430 g. (1.8 mols) of 4,4'-methylene-bis-(2-methylcyclohexylamine) and 175 g. (1 epoxide equivalent) of polyepoxide compound A. The adduct is mixed with 120 g. (0.7 mol) of 3,5,5-trimethyl-3-(aminomethyl)cyclohexylamine, with 80 g. (0.3 mol) of 2,4,6-tris-(dimethylaminomethyl)-phenol and with 245 g. of dibutyl phthalate.

Viscosity according to Hoeppler: 12,000 centipoises at 25° C.
Colour number according to Gardner-Holdt: 1–2
Amine group content: 5.6 equivalents/kg.

Example 23

An adduct is manufactured in the same manner as in Example 1 from 273 g. (1.6 mols) of 3,5,5-trimethyl-3-(aminomethyl)-cyclohexylamine and 175 g. (1 epoxide equivalent) of polyepoxide compound A. The adduct is mixed with 143 g. (0.6 mol) of 4,4'-methylene-bis-(2-methylcyclohexylamine), 48 g. (0.31 mol) of technical trimethyl-hexamethylenediamine (isomer mixture), 100 g. of phenol and 200 g. of dibutyl phthalate.

Viscosity according to Hoeppler: 6000 centipoises at 25° C.
Colour number according to Gardner-Holdt: 1
Amine group content: 5.3 equivalents/kg.

USE EXAMPLES

Example I 100 parts of the formulated liquid amine adduct curing agent manufactured according to Example 1 are mixed with 174 parts of the liquid polyepoxide compound B to give a ready-to-use lacquer. Its pot life is 40 minutes. If the lacquer is applied to metal, timber, glass or other substrates, coatings are obtained which cure completely in 8 hours at room temperature and are completely clear, without haze formation or surface faults. The dust-dry time is 3 hours. Such coatings were produced at a coating thickness of 300 microns on steel sheets and were tested for resistance to chemicals after a cure time of 7 days at 20° C. After 6 months at room temperature they showed no attack by 30% strength aqueous sodium hydroxide solution or by 70% strength aqueous sulphuric acid.

The determination of the pendulum hardness according to Persoz and of the deep drawing value according to Erichsen of these coatings yielded the following values:

Pendulum hardness according to Persoz in seconds

After 1 day at 20° C. _____ 254
After 7 days at 20° C. _____ 305

Deep drawing value according to Erichsen, DIN 53,156 in mm.

After 7 days at 20° C. _____ 1.2
After 7 days at 60° C. _____ 2.1

Example II

Ready-to-use lacquer compositions are manufactured by mixing 100 parts at a time of the formulated liquid amine adduct curing agents obtained according to Examples 2–23 with the liquid polyepoxide compound B in the approximately equivalent quantities specified in Table I below. Coatings with a layer thickness of 300 microns are produced on steel sheets by means of the lacquer compositions obtained. The relative atmospheric humidity during the curing and storage of the cured films is 65%.

Table I below indicates the pot life of the lacquers and the dust dry times, complete cure times, pendulum hardnesses (Persoz) and deep drawing values (Erichsen DIN 53,156) of the lacquer films.

All coatings showed a smooth highly glossy surface in addition to excellent levelling. The films were clear and free of haze, and showed no sweating-out phenomena or other faults on the surface.

TABLE I

| Amine adduct according to Example | Parts by weight of— | | Pot life in minutes at 20° C. | Dust dry time in hours at 20° C. | Time for complete cure in hours at 20° C. | Pendulum hardness according to Persoz (seconds) | | Deep drawing values according to Ericksen (mm.), after 7 days at— | |
|---|---|---|---|---|---|---|---|---|---|
| | Amine adduct | Polyepoxide Compound B | | | | After 1 day at 20° C. | After 7 days at 20° C. | 20° C. | 60° C. |
| 2 | 100 | 146 | 55 | 4 | 9 | 182 | 275 | 5.0 | 4.5 |
| 3 | 100 | 275 | 60 | 6 | 3 | 226 | 385 | 0.6 | 3.8 |
| 4 | 100 | 174 | 40 | 3 | 5 | 234 | 295 | 0.8 | 2.3 |
| 5 | 100 | 174 | 40 | 5 | 6 | 234 | 288 | 3.1 | 2.5 |
| 6 | 100 | 260 | 60 | 6 | 3 | 270 | 372 | 0.6 | 4.4 |
| 7 | 100 | 191 | 70 | 4 | 6 | 195 | 310 | 0.6 | 2.1 |
| 8 | 100 | 191 | 20 | 7 | 3 | 191 | 292 | 0.9 | 6.6 |
| 9 | 100 | 210 | 20 | 9 | 4 | 228 | 288 | 0.8 | 2.4 |
| 10 | 100 | 214 | 45 | 4 | 4 | 280 | 312 | 0.8 | 3.9 |
| 11 | 100 | 270 | 60 | 5 | 7 | 230 | 328 | 0.9 | 4.1 |
| 12 | 100 | 180 | 210 | 5 | 14 | 97 | 326 | 1.2 | 6.6 |
| 13 | 100 | 180 | 180 | 6 | 20 | 80 | 282 | 0.7 | 3.2 |
| 14 | 100 | 180 | 200 | 6 | 15 | 95 | 318 | 1.8 | 6.8 |
| 15 | 100 | 140 | 110 | 6 | 9 | 243 | 303 | 4.5 | 3.2 |
| 16 | 100 | 180 | 190 | 16 | 9 | 170 | 334 | 0.5 | 2.4 |
| 17 | 100 | 148 | 70 | 6 | 7 | 264 | 285 | 7.2 | 5.6 |
| 18 | 100 | 162 | 120 | 6 | 7 | 170 | 279 | 4.1 | 3.9 |
| 19 | 100 | 210 | 110 | 7 | 5 | 220 | 312 | 2.4 | 5.7 |
| 20 | 100 | 143 | 45 | 4 | 7 | 272 | 286 | 7.1 | 5.6 |
| 21 | 100 | 175 | 40 | 6 | 5 | 238 | 298 | 4.0 | 4.1 |
| 22 | 100 | 175 | 60 | 5 | 6 | 235 | 310 | 2.1 | 3.9 |
| 23 | 100 | 172 | 50 | 4 | 9 | 248 | 304 | 2.8 | 4.2 |

We claim:

1. As a curing agent for epoxy resins a composition which is liquid at room temperature and which comprises
   (a) the adduct from (1) a polyglycidyl ether of a polyphenyl, which is liquid at room temperature, and (2) a cycloaliphatic or cycloaliphatic-aliphatic di-primary diamine, in which at least one of the primary amino groups is bonded to an endocyclic carbon atom of a cycloaliphatic ring, with the proviso that 1.5 to 2.7 mols of the diamine (2) are employed per 1 epoxide equivalent of the polyglycidyl ether (1) for adduct formation, and
   (b) as diluent a substance or mixture of substances which are easily compatible with the adduct (a) and are liquid at room temperature and have a viscosity at 25° C. of at most about 500 cp. and a boiling point of at least about 220° C., said composition containing from 5 to 40% by weight of diluent (b).

2. A curing agent as claimed in claim 1, wherein 1,8-diamino-p-menthane, 3-aminomethyl-3,5,5-trimethyl-1-cyclohexylamine or 4,4'-methylene-bis-(2-methyl-cyclohexylamine) has been used as the diamine (2) for adduct formation.

3. A curing agent as claimed in claim 1 wherein a polyglycidyl ether of bis(p-hydroxyphenyl)-dimethylmethane which is liquid at room temperature, has been used as the polyglycidyl ether (1) for adduct formation.

4. A composition as claimed in claim 1, wherein the diluent (b) is a liquid plasticizer.

5. A composition as claimed in claim 4, wherein the plasticizer contained as the diluent (b) is di-n-butyl phthalate or a polypropylene glycol.

6. A composition as claimed in claim 1 which contains as the diluent, (b) a liquid aliphatic, cycloaliphatic or cycloaliphatic-aliphatic polyamine of low volatility.

7. A composition as claimed in claim 6, wherein the polyamine contained as the diluent (b) is a mixture of 1,6-diamine-2,2,4-trimethylhexane and 1,6-diamine-2,4,4-trimethylhexane.

8. A composition as claimed in claim 6, wherein the polyamine contained as the diluent (b) is 3-aminomethyl-3,5,5-trimethyl-1-cyclohexylamine or 4,4'-methylene-bis-(2-methylcyclohexylamine).

9. A composition as claimed in claim 1 in which diluent (b) comprises from 0 to 30% by weight, of a liquid plasticizer and from 0 to 17% by weight of a liquid aliphatic, cycloaliphatic or cycloaliphatic-aliphatic polyamine.

10. A composition as claimed in claim 1 which in addition contains, as cure accelerator, a monophenol or a polyphenol or an aminophenol in an amount of at most 18% by weight calculated on the total weight of the composition.

11. A composition as claimed in claim 10 wherein the cure accelerator is phenol or 2,2-bis(p-hydroxyphenyl) propane or 2,4,6-tris-(dimethylamino-methyl)phenol.

12. A composition as claimed in claim 6 in which the ratio of mols of total amine per epoxide equivalent of polyglycidyl ether employed for the formation of the adduct (a) does not exceed 2.7, said total amine comprising the amine used to form the adduct (a) plus the amine used in the diluent (b).

References Cited

UNITED STATES PATENTS 2,909,448　10/1959　Schroeder ___ 260—47 EpCN X
3,029,286　4/1962　Bressler et al. _ 260—2 EpCN X

FOREIGN PATENTS 691,543　5/1953　Great Britain __ 260—47 EpCN
6,613,263　3/1967　Netherlands ____ 260—2 EpCN LEWIS T. JACOBS, Primary Examiner U.S. Cl. X.R.

260—32.6 R, 33.4 EP, 47 EN